(12) United States Patent
Suyama et al.

(10) Patent No.: US 11,318,834 B2
(45) Date of Patent: May 3, 2022

(54) VEHICLE DRIVING APPARATUS

(71) Applicant: AISIN CORPORATION, Kariya (JP)

(72) Inventors: Daiki Suyama, Okazaki (JP); Hiroaki Sanji, Takahama (JP); Mitsuhiro Ichioka, Nishio (JP); Yuki Kawaguchi, Gamagori (JP)

(73) Assignee: AISIN CORPORATION, Kariya (JP)

( * ) Notice: Subject to any disclaimer, the term of this patent is extended or adjusted under 35 U.S.C. 154(b) by 155 days.

(21) Appl. No.: 16/644,984

(22) PCT Filed: Sep. 28, 2018

(86) PCT No.: PCT/JP2018/036278
§ 371 (c)(1),
(2) Date: Mar. 6, 2020

(87) PCT Pub. No.: WO2019/073821
PCT Pub. Date: Apr. 18, 2019

(65) Prior Publication Data
US 2020/0282828 A1 Sep. 10, 2020

(30) Foreign Application Priority Data

Oct. 13, 2017 (JP) .............................. JP2017-199763

(51) Int. Cl.
*B60K 17/16* (2006.01)
*B60L 15/20* (2006.01)
(Continued)

(52) U.S. Cl.
CPC .......... *B60K 17/16* (2013.01); *B60L 15/2036* (2013.01); *F16H 1/28* (2013.01);
(Continued)

(58) Field of Classification Search
CPC ......... B60K 17/16; B60K 17/165; F16H 1/28; F16H 57/0424
See application file for complete search history.

(56) References Cited

U.S. PATENT DOCUMENTS

| 6,074,321 A | 6/2000 | Maeda et al. |
| 2008/0182712 A1* | 7/2008 | Kira ........................ B60K 6/48 477/7 |

FOREIGN PATENT DOCUMENTS

| EP | 1 950 076 A1 | 7/2008 |
| JP | H08-48164 A | 2/1996 |

(Continued)

OTHER PUBLICATIONS

Sep. 30, 2020 European Search Report issued in European Patent Application No. 18 86 6903.

(Continued)

*Primary Examiner* — Derek D Knight
(74) *Attorney, Agent, or Firm* — Oliff PLC

(57) ABSTRACT

A vehicle driving apparatus including: a rotating electrical machine that acts as a source of driving force for a first wheel and a second wheel; a speed reduction device that reduces a speed of rotation of the rotating electrical machine; a differential gear device that distributes, to the first wheel and the second wheel, the driving force transmitted from the rotating electrical machine via the speed reduction device; a case that houses the rotating electrical machine, the speed reduction device, and the differential gear device; and an oil circulator.

20 Claims, 6 Drawing Sheets

(51) Int. Cl.
    *F16H 1/28*     (2006.01)
    *F16H 48/06*    (2006.01)
    *F16H 57/04*    (2010.01)
    *H02K 9/19*     (2006.01)

(52) U.S. Cl.
    CPC ............. *F16H 48/06* (2013.01); *F16H 57/04* (2013.01); *H02K 9/19* (2013.01)

(56) References Cited

FOREIGN PATENT DOCUMENTS

| | | |
|---|---|---|
| JP | H11-166609 A | 6/1999 |
| JP | 2005-008143 A | 1/2005 |
| JP | 4016804 B2 | 12/2007 |
| JP | 2008-185078 A | 8/2008 |
| JP | 2011-120417 A | 6/2011 |
| JP | 2016-068663 A | 5/2016 |

OTHER PUBLICATIONS

Jan. 8, 2019 International Search Report issued in International Patent Application No. PCT/JP2018/036278.

* cited by examiner

VEHICLE DRIVING APPARATUS

BACKGROUND

The present disclosure relates to a vehicle driving apparatus including the following: a rotating electrical machine that acts as a source of driving force for a first wheel and a second wheel; a speed reduction device that reduces the speed of rotation of the rotating electrical machine; a differential gear device that distributes, to the first wheel and the second wheel, the driving force transmitted from the rotating electrical machine via the speed reduction device; and a case that houses them.

Japanese Unexamined Patent Application Publication No. H8-48164 discloses a vehicle driving apparatus configured such that oil is supplied by an oil pump to a rotating electrical machine, a speed reduction device, and a differential gear device that are located in a case, so as to lubricate and cool them.

In this type of vehicle driving apparatus, setting an appropriate amount of oil in a case is the issue. For example, a lack of oil stored in an inside space of the case may result in insufficient cooling of a stator of a rotating electrical machine, insufficient lubrication of a rotating member of the rotating electrical machine, such as a rotor, etc. In contrast, an excess amount of oil stored in the inside space of the case may increase resistance of oil to stirring by the rotating member of the rotating electrical machine, such as a rotor.

SUMMARY

An exemplary aspect of the disclosure achieves a vehicle driving apparatus that ensures an appropriate amount of oil in a case when the oil is stored in a space located in the case and housing a rotating electrical machine.

In view of the above, a vehicle driving apparatus includes the following characteristic structure: a rotating electrical machine that acts as a source of driving force for a first wheel and a second wheel; a speed reduction device that reduces the speed of rotation of the rotating electrical machine; a differential gear device that distributes, to the first wheel and the second wheel, the driving force transmitted from the rotating electrical machine via the speed reduction device; a case that houses the rotating electrical machine, the speed reduction device, and the differential gear device; and an oil circulator. The rotating electrical machine has a cylinder-shaped stator and a rotor that is located on a radially inner side relative to the stator. The speed reduction device and the differential gear device are located coaxial with the rotating electrical machine. Oil is stored in the case. The oil circulator circulates the oil within the case. In a steady circulation state where circulation of the oil is in a steady state, an oil surface that is the top surface of the oil is positioned on a lower side relative to a lower end of an inner circumferential surface of the stator and is positioned on an upper side relative to a lower end of an outer circumferential surface of the stator.

According to this characteristic structure, in the steady circulation state where the position of the oil surface is stable, it is possible to ensure a relatively large amount of the oil that allows the stator to be partially submerged in the oil surface while keeping the rotor, which is a rotating member of the rotating electrical machine, out of contact with the oil surface. Thus, when the oil is stored in a space located in the case and housing the rotating electrical machine, it is possible to reduce resistance of the oil to stirring by the rotor of the rotating electrical machine while ensuring an appropriate amount of the oil needed to cool the stator of the rotating electrical machine, to lubricate a rotating member such as the rotor, etc.

DETAILED DESCRIPTION OF EMBODIMENTS

Figure 1:
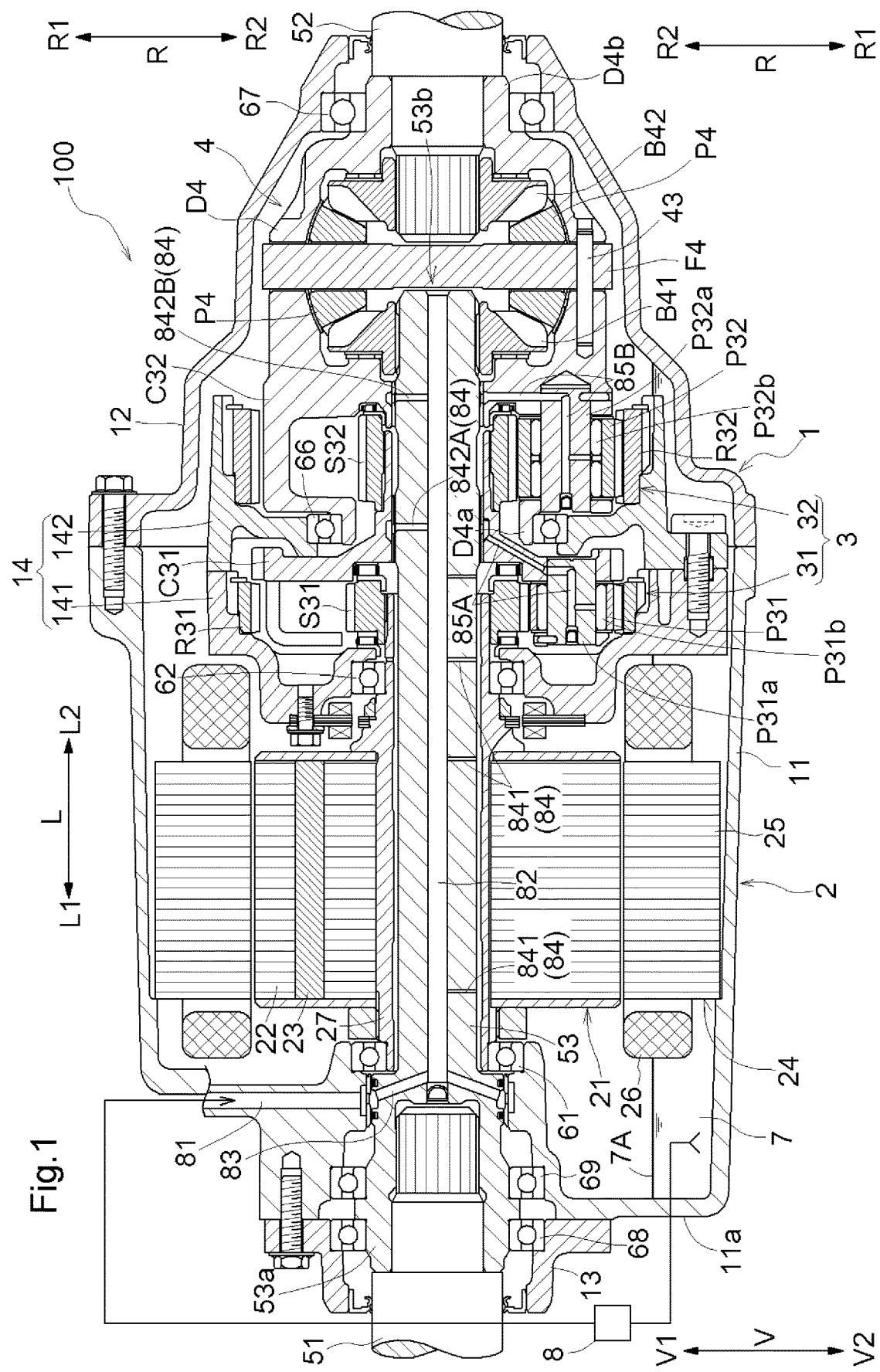
FIG. 1 is an axial cross-sectional view of a vehicle driving apparatus according to an embodiment.
Figure 2:
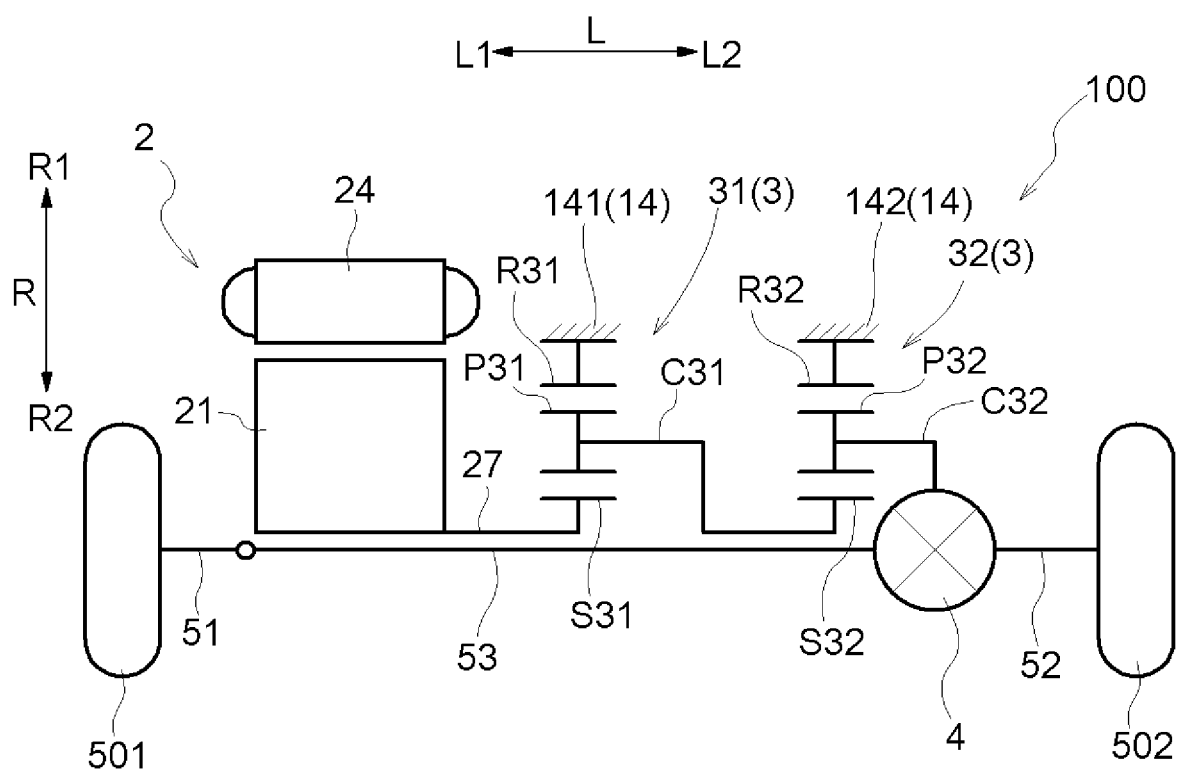
FIG. 2 is a skeleton diagram of the vehicle driving apparatus according to the embodiment.

A vehicle driving apparatus 100 according an embodiment of a vehicle driving apparatus is described below with reference to the drawings. FIG. 1 is an axial cross-sectional view of the vehicle driving apparatus 100, and FIG. 2 is a skeleton diagram of the vehicle driving apparatus 100. The vehicle driving apparatus 100 is a driving apparatus to be mounted on, for example, a hybrid vehicle that uses both an internal combustion engine and a rotating electrical machine as sources of driving force for a first wheel 501 and a second wheel 502, or an electric vehicle that uses a rotating electrical machine as a source of driving force for the first wheel 501 and the second wheel 502. As illustrated in FIG. 1 and FIG. 2, the vehicle driving apparatus 100 includes a rotating electrical machine 2 only as a source of driving force for the first wheel 501 and the second wheel 502. In the case of four-wheel vehicles with two-wheel drive, this makes it possible to achieve electric vehicles. On the other hand, in the case of four-wheel vehicles with four-wheel drive, it is possible to achieve hybrid vehicles by driving the other two wheels using driving force of an internal combustion engine. Undoubtedly, in the case of four-wheel vehicles with four-wheel drive, it is possible to archive electric vehicles with four-wheel drive by using the vehicle driving apparatus 100 according to the present embodiment also for the other two wheels.

In the description below, "drivingly coupled" refers to a state where two rotating elements are coupled together such that driving force is transmittable therebetween. This includes a state where the two rotating elements are coupled in such a manner as to rotate together as a unit, or a state where the two rotating elements are coupled via one or two or more transmission members such that driving force is transmittable therebetween. The transmission members are various types of members that transmit rotation while maintaining or changing the rotation speed. Examples of the transmission members may include a shaft, a gear mechanism, a belt, and a chain. The transmission members may include an engagement device that selectively transmits rotation and driving force, such as a friction engagement device or an intermesh engagement device. However, as for rotating elements of a speed reduction device 3 and a differential gear device 4 that are described below, the expression "drivingly coupled" refers to a state where three or more rotating elements of each of the devices are drivingly coupled without other rotating elements interposed therebetween.

As illustrated in FIG. 1 and FIG. 2, the vehicle driving apparatus 100 includes the following: a case 1; a rotating electrical machine 2 having a rotor shaft 27 for outputting driving force; the speed reduction device 3 including a planetary gear mechanism; and the differential gear device 4 that distributes the driving force from the rotating electrical machine 2 to a first drive shaft 51, drivingly coupled to an intermediate shaft 53, and a second drive shaft 52.

In the vehicle driving apparatus 100, the rotating electrical machine 2, the speed reduction device 3, the differential gear device 4, the first drive shaft 51, the second drive shaft 52, and the intermediate shaft 53 are coaxially disposed with respect to the rotor shaft 27 of the rotating electrical machine 2. Thus, the axial direction of the rotor shaft 27 of the rotating electrical machine 2 is equivalent to the direction of the axis of rotation of the vehicle driving apparatus 100, and the radial direction of the rotor shaft 27 of the rotating electrical machine 2 is equivalent to the radial direction of the vehicle driving apparatus 100. Therefore, the axial direction of the rotor shaft 27 of the rotating electrical machine 2 is referred to as an axial direction L of the vehicle driving apparatus 100, and the radial direction of the rotor shaft 27 of the rotating electrical machine 2 is referred to as a radial direction R of the vehicle driving apparatus 100. Further, in the axial direction L, a side toward the rotating electrical machine 2 with respect to the speed reduction device 3 is referred to as an axial first side L1, and a side toward the differential gear device 4 with respect to the speed reduction device 3 is referred to as an axial second side L2. Further, in the radial direction R, an outer side away from the rotor shaft 27 is referred to as a radially outer side R1, and an inner side toward the rotor shaft 27 is referred to as a radially inner side R2. Further, the vertical direction of the vehicle driving apparatus 100 being mounted on a vehicle is referred to as a vertical direction V. An upper side in the vertical direction is referred to as an upper side V1, and a lower side in the vertical direction is referred to as a lower side V2.

The case 1 houses therein the rotating electrical machine 2, the speed reduction device 3, and the differential gear device 4. According to the present embodiment, the case 1 further houses therein a portion (an end portion on the axial second side L2) of the first drive shaft 51), a portion (an end portion on the axial first side L1) of the second drive shaft 52, and the intermediate shaft 53. The case 1 has the following: a case body 11 shaped like a tube with a bottom; a tube-shaped body cover 12 located to cover an opening of the case body 11 (on the axial second side L2) opposite to a bottom portion 11a that is located at an end portion of the case body 11 on the axial first side L1; and a bottom cover 13 located on the axial first side L1 relative to the bottom portion 11a of the case body 11 to cover the bottom portion 11a. The case body 11 and the body cover 12 are fixed to each other by a fastening member (according to the present embodiment, a bolt). The case body 11 and the bottom cover 13 are fixed to each other by a fastening member (according to the present embodiment, a bolt).

The rotating electrical machine 2 and a portion of the speed reduction device 3 (a first planetary gear mechanism 31 that is described later) are located in an inside space of the case body 11. Another portion of the speed reduction device 3 (a second planetary gear mechanism 32 that is described later), the differential gear device 4, and a portion (an end portion on the axial first side L1) of the second drive shaft 52 are located in an inside space of the body cover 12. A portion (an end portion on the axial second side L2) of the first drive shaft 51 is located in an inside space that is formed by the case body 11 and the bottom cover 13. The intermediate shaft 53 is located in an inside space formed by the case body 11, the body cover 12, and the bottom cover 13. According to the present embodiment, when the rotating electrical machine 2, the speed reduction device 3, and the differential gear device 4 are housed in the case 1, the inside space of the case body 11 and the inside space of the body cover 12 form a single, continuous space. That is, within the case 1, the space housing the rotating electrical machine 2 and the space housing both the speed reduction device 3 and the differential gear device 4 communicate with each other.

The case 1 further has a supporting member 14. According to the present embodiment, the supporting member 14 includes a first supporting member 141 and a second supporting member 142. The first supporting member 141 is provided between the rotating electrical machine 2 and the speed reduction device 3 to extend along the radial direction R and a circumferential direction. In this example, the first supporting member 141 is formed continuously over the entire area in the circumferential direction. Although illustrations are omitted, an end portion of the first supporting member 141 on the radially outer side R1 is integrally fixed to the case body 11 of the case 1 at one or multiple locations in the circumferential direction of the first supporting member 141. The second supporting member 142 is located on the axial second side L2 relative to the first supporting member 141 and is integrally fixed to the first supporting member 141. The second supporting member 142 is provided between the first planetary gear mechanism 31 and the second planetary gear mechanism 32 of the speed reduction device 3 to extend along the radial direction R and the circumferential direction. In this example, the second supporting member 142 is formed continuously over the entire area in the circumferential direction.

The rotating electrical machine 2, as described above, is a source of driving force for the first wheel 501 and the second wheel 502. The rotating electrical machine 2 is a permanent-magnet-type rotating electrical machine and includes the following: a rotor 21 having permanent magnets 23 within a rotor core 22; a cylinder-shaped stator 24 having a stator coil 26 wound on a stator core 25; and the rotor shaft 27 coupled to the rotor core 22 in such a manner as to rotate together as a unit. The "cylinder-shaped" means that its rough shape is a cylinder as a whole even if it has a portion that is deformed a little (as well as other expressions hereinafter with "shaped" that are used to indicate shapes or the like). The rotor shaft 27 is coupled to the rotor core 22 on the radially inner side R2 of the rotor core 22 so that the rotor 21 and the rotor shaft 27 rotate together as a unit. According to the present embodiment, the rotating electrical machine 2 is a permanent-magnet-type rotating electrical machine, but alternatively may be any other type of rotating electrical machine, such as an induction-type rotating electrical machine.

The rotor shaft 27 is cylinder-shaped. A portion of the rotor shaft 27 that protrudes beyond the rotor core 22 in the axial direction L toward the axial first side L1 is rotatably supported by the case body 11 of the case 1 via a first rotor bearing 61. A portion of the rotor shaft 27 that protrudes beyond the rotor core 22 in the axial direction L toward the axial second side L2 is rotatably supported by the first supporting member 141 of the supporting member 14 via the second rotor bearing 62.

The speed reduction device 3 is located between the rotating electrical machine 2 and the differential gear device 4 in the axial direction L, and transmits driving force to the differential gear device 4 while reducing the speed of rotation of the rotating electrical machine 2. According to the present embodiment, the speed reduction device 3 includes the first planetary gear mechanism 31 and the second planetary gear mechanism 32.

The first planetary gear mechanism 31 is a single-pinion-type planetary gear mechanism and includes a first sun gear S31, a first ring gear R31, a first carrier C31, and a first pinion gear P31. The first sun gear S31 is an input element of the first planetary gear mechanism 31 and is coupled to the rotor shaft 27 of the rotating electrical machine 2 in such a manner as to rotate together as a unit. The first ring gear R31 is supported on the first supporting member 141 of the supporting member 14 in such a manner as to be unrotatable in the circumferential direction. The first carrier C31 is an output element of the first planetary gear mechanism 31. The first pinion gear P31 is located in such a manner as to intermesh with both the first sun gear S31 and the first ring gear R31, and is rotatably supported by the first carrier C31. The first pinion gear P31 is structured in such a manner as to spin (rotate) on its own axis and to spin (revolve) around the first sun gear S31 (revolution). Although illustrations are omitted, multiple first pinion gears P31 are spaced from each other along the path of their revolution.

The second planetary gear mechanism 32 is located adjacent to the first planetary gear mechanism 31 in the axial direction L and is located on the opposite side of the first planetary gear mechanism 31 from the rotating electrical machine 2. That is, in the axial direction L, from the axial first side L1 to the axial second side L2, the rotating electrical machine 2, the first planetary gear mechanism 31, and the second planetary gear mechanism 32 are disposed in the order mentioned. The second planetary gear mechanism 32 is a single-pinion-type planetary gear mechanism and includes a second sun gear S32, a second ring gear R32, a second carrier C32, and a second pinion gear P32.

The second sun gear S32 is an input element of the second planetary gear mechanism 32. According to the present embodiment, the second sun gear S32 is rotatably supported with respect to the intermediate shaft 53 via a plain bearing such as a bushing. Further, according to the present embodiment, the second sun gear S32 is coupled through spline engagement to the first carrier C31 of the first planetary gear mechanism 31. The second sun gear S32 and the first carrier C31 may be structured from a single component, or may be joined together by welding or the like into an integrated structure. The second ring gear R32 is supported on the second supporting member 142 of the supporting member 14 in such a manner as to be unrotatable in the circumferential direction. The second carrier C32 is an output element of the second planetary gear mechanism 32. According to the present embodiment, an end portion of the second carrier C32 on the axial first side L1 is rotatably supported by the second supporting member 142 of the supporting member 14 via a first differential case bearing 66 at a location between the first planetary gear mechanism 31 and the second planetary gear mechanism 32 of the speed reduction device 3. The second pinion gear P32 is located in such a manner as to intermesh with both the second sun gear S32 and the second ring gear R32, and is rotatably supported by the second carrier C32. The second pinion gear P32 is structured in such a manner as to spin (rotate) on its own axis and to spin (revolve) around the second sun gear S32. Although illustrations are omitted, multiple second pinion gears P32 are spaced from each other along the path of their revolution.

The differential gear device 4 distributes, to the first wheel 501 and the second wheel 502, the driving force transmitted from the rotating electrical machine 2 via the speed reduction device 3. According to the present embodiment, the differential gear device 4 distributes the driving force transmitted from the rotating electrical machine 2 via the speed reduction device 3, to the first wheel 501 and the second wheel 502 respectively via the first drive shaft 51 drivingly coupled to the intermediate shaft 53 and the second drive shaft 52. Specifically, the differential gear device 4 has the following: a differential case D4 as an input element; a pinion shaft F4 supported by the differential case D4 in such a manner as to rotate as a unit with the differential case D4; a pair of differential pinion gears P4 rotatably supported with respect to the pinion shaft F4; and a first side gear B41 and a second side gear B42 as distribution output elements. The pair of differential pinion gears P4, the first side gear B41, and the second side gear B42, as described here, are all bevel gears. That is, the differential gear device 4 is a bevel-gear-type differential gear device.

The differential case D4 is a hollow member and houses therein the pinion shaft F4, the pair of differential pinion gears P4, the first side gear B41, and the second side gear B42. According to the present embodiment, the differential case D4 is formed unitarily with the second carrier C32 of the second planetary gear mechanism 32 of the speed reduction device 3, and the second carrier C32 is structured as part of the differential case D4. Thus, according to the present embodiment, an end portion of the second carrier C32 on the axial first side L1 serves as a first supportable portion D4a of the differential case D4. The first supportable portion D4a is located between the first planetary gear mechanism 31 and the second planetary gear mechanism 32 in the axial direction L. The first supportable portion D4a is supported directly by the first differential case bearing 66 that is fixed to the case 1 via the supporting member 14. As already described, the first supporting member 141 of the supporting member 14 is integrally fixed to the case body 11 of the case 1, and the first supporting member 141 and the second supporting member 142 are integrally fixed to each other. Thus, the first supportable portion D4a is supported by the case body 11 of the case 1 via the first differential case bearing 66.

The differential case D4 further has a second supportable portion D4b that is located on the side (the axial second side L2) opposite the first supportable portion D4a in the axial direction L. The second supportable portion D4b is formed to protrude beyond the second side gear B42 along the axial direction L toward the axial second side L2. The second supportable portion D4b is cylinder-shaped and is coaxial with both the first side gear B41 and the second side gear B42. The second supportable portion D4b is supported directly by a second differential case bearing 67 that is fixed to the body cover 12 of the case 1. That is, the second supportable portion D4b is rotatably supported by the body cover 12 of the case 1 via the second differential case bearing 67.

The pinion shaft F4 is inserted through the pair of differential pinion gears P4 and rotatably supports them. The pinion shaft F4 is inserted in a through hole formed in the differential case D4 along the radial direction R and is retained to the differential case D4 by a stopper member 43.

The pair of differential pinion gears P4 are attached to the pinion shaft F4 in such a manner as to face each other with a clearance therebetween in the radial direction R and are structured to rotate about the pinion shaft F4 in the inside space of the differential case D4.

The first side gear B41 and the second side gear B42 are rotating elements after distribution in the differential gear device 4. The first side gear B41 and the second side gear B42 are spaced from each other in the axial direction L to face each other across the pinion shaft F4 and are structured to rotate in their respective circumferential directions in the inside space of the differential case D4. The first side gear B41 and the second side gear B42 intermesh with the pair of differential pinion gears P4. Splines for coupling to the intermediate shaft 53 are formed on the inner circumferential surface of the first side gear B41. Splines for coupling to the second drive shaft 52 are formed on the inner circumferential surface of the second side gear B42.

The intermediate shaft 53 is a member that transmits, to the first drive shaft 51, the driving force from the rotating electrical machine 2 distributed by the differential gear device 4. The intermediate shaft 53 extends through the radially inner side R2 of the rotor shaft 27 of the rotating electrical machine 2 in the axial direction L. Splines for coupling to the first side gear B41 of the differential gear device 4 are formed on the outer circumferential surface of an end portion of the intermediate shaft 53 on the axial second side L2. The splines engage with the splines on the inner circumferential surface of the first side gear B41, and thus the intermediate shaft 53 and the first side gear B41 are coupled together in such a manner as to rotate together as a unit. A coupling portion 53a for coupling to the first drive shaft 51 is formed at an end portion of the intermediate shaft 53 on the axial first side L1.

The coupling portion 53a extends into the inside space of the bottom cover 13 from a location in the inside space of the case body 11 that is on the axial first side L1 relative to the rotating electrical machine 2. The coupling portion 53a is cylinder-shaped and is coaxial with the remaining portion of the intermediate shaft 53 other than the coupling portion 53a. The coupling portion 53a has an outside diameter greater than the outside diameter of the remaining portion of the intermediate shaft 53 other than the coupling portion 53a. The coupling portion 53a is rotatably supported by the bottom cover 13 of the case 1 via a first output bearing 68 and is also rotatably supported by the bottom portion 11a of the case body 11 via a second output bearing 69. Splines for coupling to the first drive shaft 51 are formed on the inner circumferential surface of a portion of the coupling portion 53a on the axial second side L2.

The first drive shaft 51 is drivingly coupled to the first wheel 501, and the second drive shaft 52 is drivingly coupled to the second wheel 502. According to the present embodiment, the coupling portion 53a is provided at the end portion of the intermediate shaft 53 on the axial first side L1, and the first drive shaft 51 and the coupling portion 53a of the intermediate shaft 53 are spline-coupled together. However, without being limited to such a structure, for example, a flange yoke instead of the coupling portion 53a may be provided at the end portion of the intermediate shaft 53 on the axial first side L1, and the flange yoke and the first drive shaft 51 may be bolted together.

In the vehicle driving apparatus 100 structured as described above, oil 7 is stored in the case 1 so as, for example, to cool the stator 24 of the rotating electrical machine 2 and to lubricate rotating members of the rotating electrical machine 2, such as the rotor 21. As already described, according to the present embodiment, the space housing the rotating electrical machine 2 and the space housing the speed reduction device 3 and the differential gear device 4 in the case 1 communicate with each other. Thus, the oil 7 is stored in the space housing the rotating electrical machine 2 and in the space housing both the speed reduction device 3 and the differential gear device 4.

According to the present embodiment, the vehicle driving apparatus 100 includes an oil pump 8. The oil pump 8 functions as an "oil circulation mechanism" or 'oil circulator that circulates the oil 7 within the case 1. According to the present embodiment, the oil pump 8 suctions the oil 7 stored in the case 1 and supplies the oil 7 to an oil passage that is formed on the case 1 or a member housed in the case 1. This oil passage communicates with at least one of the rotating electrical machine 2, the speed reduction device 3, and the differential gear device 4.

According to the present embodiment, an introduction oil passage 81 is formed in the bottom portion 11a of the case 1 along the radial direction R, and an in-shaft oil passage 82 is formed in the intermediate shaft 53 along the axial direction L. The introduction oil passage 81 and the in-shaft oil passage 82 communicate with each other through multiple connection oil passages 83 that are formed in the intermediate shaft 53 along the radial direction R. Further, multiple distribution passages 84 are located in the intermediate shaft 53 and are spaced from each other in the axial direction L. Each of the distribution passages 84 is formed along the radial direction R from the in-shaft oil passage 82 to the outer circumferential surface of the intermediate shaft 53. In this example, the multiple distribution passages 84 include the following: three rotating-electrical-machine distribution oil passages 841 that communicate with the rotating electrical machine 2; a first mechanism distribution passage 842A; and a second mechanism distribution passage 842B. Further, in this example, an opening 53b communicating with the in-shaft oil passage 82 is formed in an end face of the intermediate shaft 53 on the axial second side L2. Thus, the in-shaft oil passage 82 communicates with the differential gear device 4.

According to the present embodiment, the oil pump 8 suctions the oil 7 stored in the case 1 and supplies the oil 7 to the introduction oil passage 81. The oil 7 supplied to the introduction oil passage 81 flows to the in-shaft oil passage 82 through the connection oil passages 83. Then, the oil 7 is supplied through the multiple distribution passages 84 to each of the members housed in the case 1, such as the rotating electrical machine 2.

In this example, a portion of the oil 7 in the in-shaft oil passage 82 passes through the rotating-electrical-machine distribution oil passages 841 and then reaches the inner circumferential surface of the rotor shaft 27 of the rotating electrical machine 2. As a result, the rotor shaft 27 is cooled by the oil 7, and the rotor core 22 coupled to the rotor shaft 27 is cooled as well. Further, in this example, out of all the three rotating-electrical-machine distribution oil passages 841, the rotating-electrical-machine distribution oil passage 841 that is located furthest to the axial second side L2 is formed mainly to supply the oil 7 to the second rotor bearing 62 that rotatably supports the rotor shaft 27. That is, a portion of the oil 7 reaching the inner circumferential surface of the rotor shaft 27 flows to the second rotor bearing 62 through an oil passage that is formed to penetrate the rotor shaft 27 in the radial direction R, thus lubricating the second rotor bearing 62.

Further, in this example, a portion of the oil 7 in the in-shaft oil passage 82 flows through the first mechanism distribution passage 842A to a first in-mechanism oil passage 85A formed in both a first pinion shaft P31a and the first carrier C31 that rotatably support the first pinion gear P31 via a first bearing P31b. Then, the oil 7 flows to between the first pinion gear P31 and the first pinion shaft P31a through an opening formed in the outer circumferential surface of the first pinion shaft P31a, thus lubricating the first bearing P31b. After that, as the first pinion gear P31 rotates, the oil 7 is splashed around. Thus, the oil 7 is supplied to each member of the first planetary gear mechanism 31. Furthermore, in this example, the oil 7 in the in-shaft oil passage 82 flows through the second mechanism distribution passage 842B to a second in-mechanism oil passage 85B formed in both a second pinion shaft P32a and the second carrier C32 that rotatably support the second pinion gear P32 via a second bearing P32b. Then, the oil 7 flows to between the second pinion gear P32 and the second pinion shaft P32a through an opening formed in the outer circumferential surface of the second pinion shaft P32a, thus lubricating the second bearing P32b. After that, as the second pinion gear P32 rotates, the oil 7 is splashed around. Thus, the oil 7 is supplied to each member of the second planetary gear mechanism 32.

Further, in this example, a portion of the oil 7 in the in-shaft oil passage 82 flows into the differential case D4 of the differential gear device 4 through the opening 53b that is formed in the end face of the intermediate shaft 53 on the axial second side L2. Then, as the differential case D4 rotates, the oil 7 is supplied to each member of the differential gear device 4.

An alternative structure may be such that the oil 7 in the case 1 is circulated by being scooped up with a scooping member that is structured from a rotating member having projections and recesses, such as a gear. In this structure, the scooping member functions as the "oil circulation mechanism" that circulates the oil 7 within the case 1. In this case, the oil 7 scooped up may be supplied directly to a member to which the oil 7 is to be supplied, such as the rotating electrical machine 2, or may be supplied first to the introduction oil passage 81 and then supplied through the oil passages described above to the member to which the oil 7 is to be supplied. The scooping member may be provided to, for example, the carriers C31 and C32 of the speed reduction device 3 or the differential case D4 of the differential gear device 4. The scooping member may be provided instead of the oil pump 8 or in addition to the oil pump 8.

Figure 3:
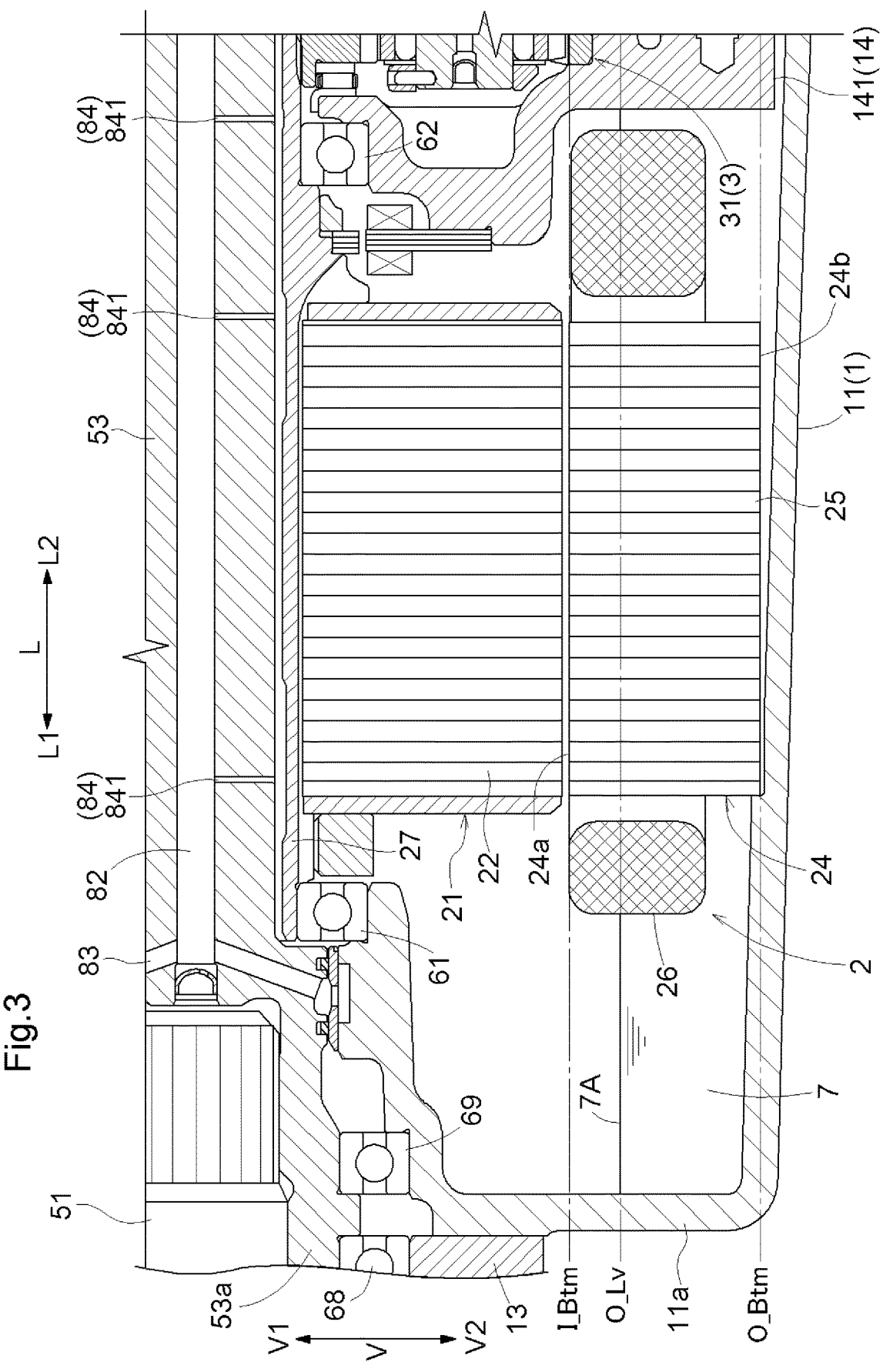
FIG. 3 is an axial cross-sectional view of a main portion of the vehicle driving apparatus according to the embodiment.

In a steady circulation state where circulation of the oil 7 in the case 1 is in a steady state, an oil surface 7A that is the top surface of the oil 7 stored in the case 1 is positioned on the lower side V2 relative to the lower end of an inner circumferential surface 24a of the stator 24 of the rotating electrical machine 2 and is positioned on the upper side V1 relative to the lower end of an outer circumferential surface 24b of the stator 24. As illustrated in FIG. 3, in the steady circulation state, an oil surface position O_Lv that is the position of the oil surface 7A in the vertical direction V is positioned on the lower side V2 relative to a stator inner circumference lower end position I_Btm that is the position of the lower end of the inner circumferential surface 24a of the stator 24 and is also positioned on the upper side V1 relative to a stator outer circumference lower end position O_Btm that is the position of the lower end of the outer circumferential surface 24b of the stator 24.

The "steady circulation state" herein is a state where circulation of the oil 7 in the case 1 is in a steady state. Specifically, when the oil pump 8 is used to circulate the oil 7 in the case 1, the "steady circulation state" is a state where the oil surface position O_Lv is stable while the oil pump 8 is operating. On the other hand, when the scooping member is used to circulate the oil 7 in the case 1, it is a state where the oil surface position O_Lv is stable while the scooping member is rotating. Basically, the "steady circulation state" occurs while the vehicle is moving (while the rotating electrical machine 2 is rotating), but this does not exclude the possibility that the "steady circulation state" may occur while the vehicle (the rotating electrical machine 2, the wheels 501, 502) is at rest.

Although the tilt of the vehicle in a direction (a vehicle longitudinal direction) perpendicular to the axial direction L is permissible, the tilt of the vehicle in the axial direction L (a vehicle lateral direction) causes the oil surface position O_Lv in the case 1 to vary depending on the location in the axial direction L. Therefore, the oil surface position O_Lv in the steady circulation state described above is determined when the vehicle is not tilted at all in the axial direction L (a vehicle lateral direction). Obviously, if the oil surface 7A fluctuates due to vibration, acceleration, or deceleration of the vehicle, the oil surface position O_Lv is unstable. Therefore, the oil surface position O_Lv in the steady circulation state described above is determined when there are no such fluctuations in the oil surface 7A due to vibration, acceleration, or deceleration of the vehicle.

Figure 4:
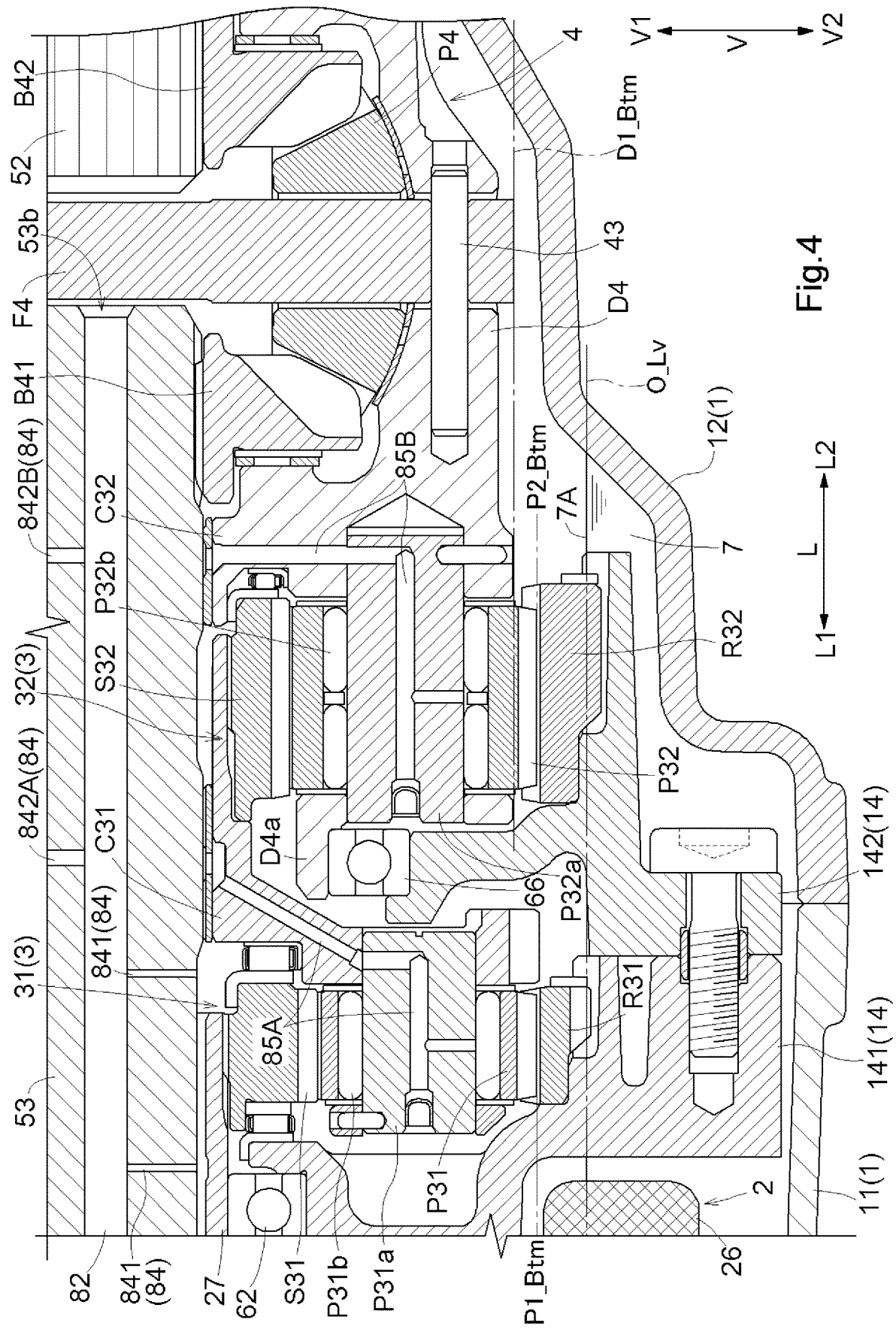
FIG. 4 is an axial cross-sectional view of a main portion of the vehicle driving apparatus according to the embodiment.

It is preferable that in the steady circulation state, the oil surface 7A of the oil 7 stored in the case 1 be positioned on the lower side V2 relative to the lower end of the path of revolution of the pinion gear of the planetary gear mechanism of the speed reduction device 3. According to the present embodiment, the inside diameter of the stator 24 is equal to or greater than the outside diameter of the path of revolution of the pinion gear of the planetary gear mechanism of the speed reduction device 3. As described above, in the steady circulation state, the oil surface 7A is positioned on the lower side V2 relative to the lower end of the inner circumferential surface 24a of the stator 24 of the rotating electrical machine 2. Thus, when the inside diameter of the stator 24 and the outside diameter of the path of revolution of the pinion gear have the relationship described above, the oil surface 7A is naturally positioned on the lower side V2 relative to the lower end of the path of revolution of the pinion gear. When the speed reduction device 3 includes multiple planetary gear mechanisms, it is preferable that in the steady circulation state, the oil surface 7A be positioned on the lower side V2 relative to the lower end of the path of revolution of the planetary gear mechanism that is located furthest to the lower side V2 of all the lower ends of the paths of revolution of the multiple planetary gear mechanisms. According to the present embodiment, the speed reduction device 3 includes two planetary gear mechanisms, namely, the first planetary gear mechanism 31 and the second planetary gear mechanism 32. As illustrated in FIG. 4, a first pinion lower end position P1_Btm that is the position of the lower end of the path of revolution of the first pinion gear P31 of the first planetary gear mechanism 31 is set equal to a second pinion lower end position P2_Btm that is the position of the lower end of the path of revolution of the second pinion gear P32 of the second planetary gear mechanism 32. Thus, it is preferable that in the steady circulation state, the oil surface position O_Lv be positioned on the lower side V2 relative to both the first pinion lower end position P1_Btm and the second pinion lower end position P2_Btm.

Further, it is preferable that in the steady circulation state, the oil surface 7A of the oil 7 stored in the case 1 may be positioned on the lower side V2 relative to the lower end of the differential gear device 4. The lower end of the differential gear device 4 refers to the lower end of a portion of the differential gear device 4, which rotates as a whole, when the portion protruding furthest to the radially outer side R1 is at its lowest position. Thus, according to the present embodiment, the lower end of the differential gear device 4 is the lower end of the pinion shaft F4 that is in an attitude extending in the vertical direction V. According to the present embodiment, as illustrated in FIG. 4, in the steady circulation state, the oil surface position O_Lv is positioned on the lower side V2 relative to a first differential lower end position D1_Btm that is the position of the lower end of the differential gear device 4.

Figure 6:
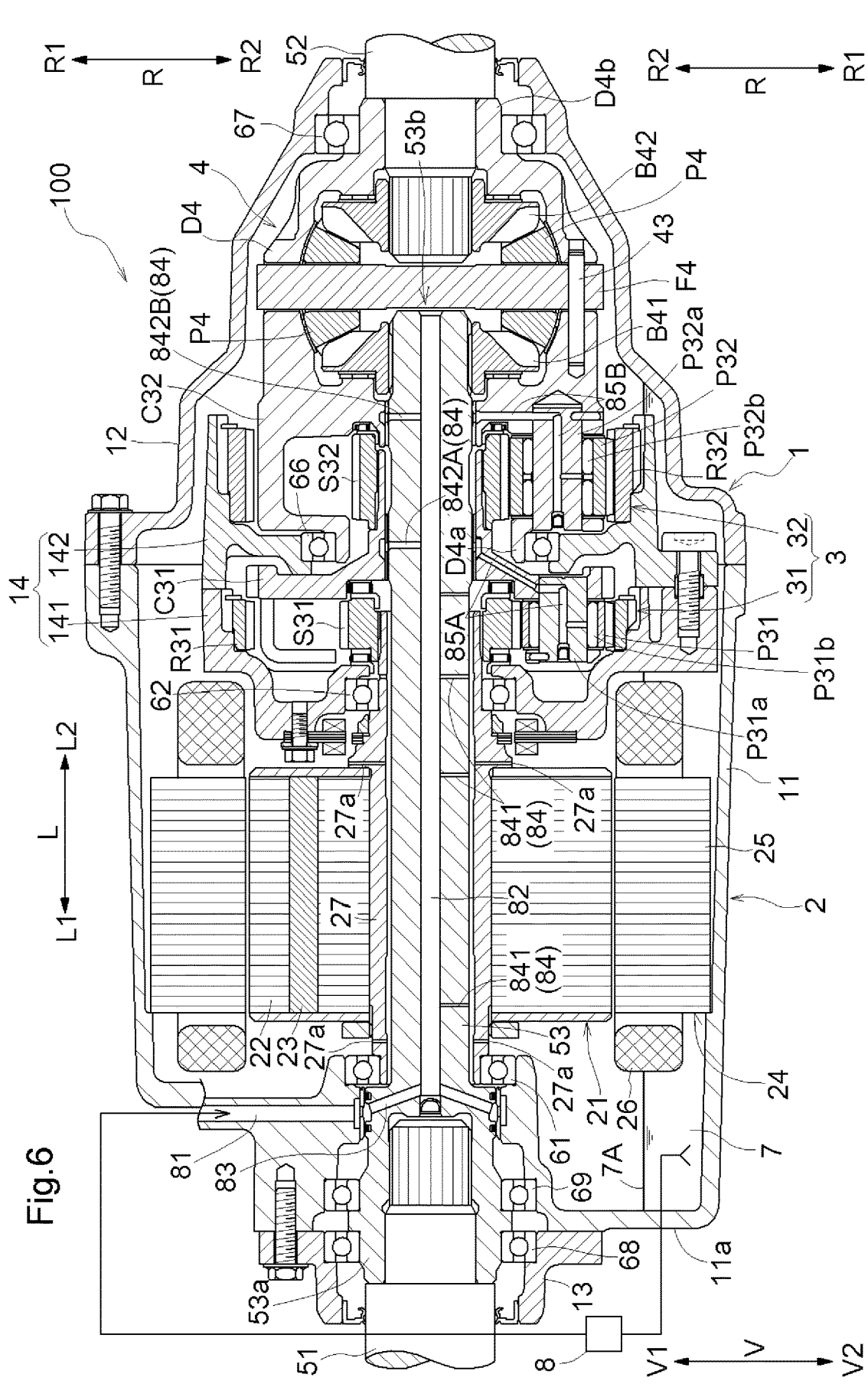
FIG. 6 is an axial cross-sectional view of a vehicle driving apparatus according to another embodiment.

OTHER EMBODIMENTS (1) According to the example described in the above embodiment, a portion of the oil 7 in the in-shaft oil passage 82 reaches the inner circumferential surface of the rotor shaft 27 of the rotating electrical machine 2 through the three rotating-electrical-machine distribution oil passages 841, thus cooling the rotor shaft 27 and the rotor core 22 while lubricating the second rotor bearing 62. However, without being limited to such a structure, for example, as illustrated in FIG. 6, the oil 7 reaching the inner circumferential surface of the rotor shaft 27 may be supplied to the stator 24 through multiple rotor-shaft oil passages 27a that are formed to penetrate the rotor shaft 27 in the radial direction R. In the illustrated example, the rotor-shaft oil passages 27a are formed on both sides of the rotor core 22 in the axial direction L and are circumferentially spaced from each other. The oil that has passed through the rotor-shaft oil passages 27a is sprayed toward the radially outer side R1 by centrifugal force caused by rotation of the rotor shaft 27, and is thus supplied to a coil end section of the stator coil 26. An oil passage for supplying the oil 7 to the permanent magnet 23 located within the rotor core 22 may be formed to the rotor core 22, and an oil passage for supplying the oil 7 to the stator 24 from the radially outer side R1 may be formed to the case body 11.

Figure 5:
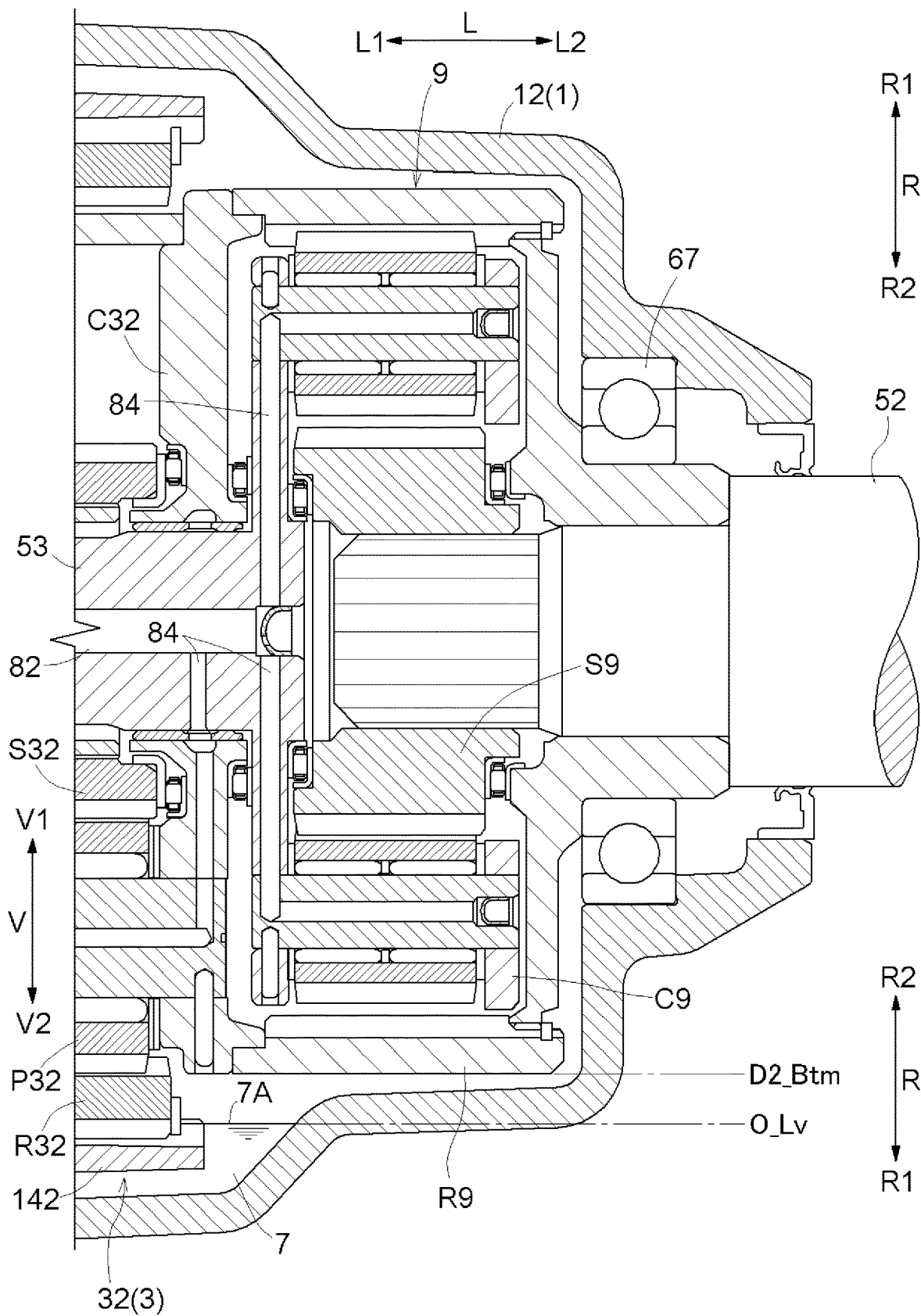
FIG. 5 is an axial cross-sectional view of a main portion of a vehicle driving apparatus including a differential gear device according to another embodiment.

(2) According to the example described in the above embodiment, the bevel-gear-type differential gear device 4 is provided as a differential gear device. However, without being limited to such a structure, for example, a third planetary gear mechanism 9 that functions as a planetary-gear-type differential gear device may be provided instead of the differential gear device 4. As illustrated in FIG. 5, the third planetary gear mechanism 9 is a double-pinion-type planetary gear mechanism and includes a third sun gear S9, a third carrier C9, and a third ring gear R9. The third ring gear R9 is an input element of the third planetary gear mechanism 9 and is coupled to the second carrier C32 of the second planetary gear mechanism 32 in such a manner as to rotate together as a unit. On the other hand, the third sun gear S9 and the third carrier C9 are distribution output elements of the third planetary gear mechanism 9. In this example, the third carrier C9 is coupled to the intermediate shaft 53, and a coupling portion (splines) for coupling to the second drive shaft 52 is formed on the third sun gear S9. The third ring gear R9 is located furthest to the radially outer side R1 in the third planetary gear mechanism 9. In this case, it is preferable that in the steady circulation state, the oil surface position O_Lv be positioned on the lower side V2 relative to a second differential lower end position D2_Btm that is the position of the lower end of the outer circumferential surface of the third ring gear R9 of the third planetary gear mechanism 9.

(3) According to the example described in the above embodiment, the two planetary gear mechanisms 31 and 32 are provided as the speed reduction device 3. However, without being limited to such a structure, one or three or more planetary gear mechanisms may be provided as the speed reduction device 3.

(4) According to the example described in the above embodiment, the differential case D4 of the differential gear device 4 is formed unitarily with the second carrier C32 of the second planetary gear mechanism 32. However, without being limited to such a structure, the differential case D4 and the second carrier C32 may be separable from each other (for example, coupled to each other by a bolt, a spline, or the like).

(5) According to the example described in the above embodiment, the inside diameter of the stator 24 is equal to or greater than the outside diameter of the path of revolution of the pinion gear of the planetary gear mechanism of the speed reduction device 3. However, without being limited to this, the inside diameter of the stator 24 may be less than the outside diameter of the path of revolution of the pinion gear of the planetary gear mechanism of the speed reduction device 3. Also in this case, it is preferable that in the steady circulation state, the oil surface 7A be positioned on the lower side V2 relative to the lower end of the path of revolution of the pinion gear of the planetary gear mechanism of the speed reduction device 3.

(6) According to the example described in the above embodiment, in the steady circulation state, the oil surface 7A is positioned on the lower side V2 relative to the lower end of the inner circumferential surface 24a of the stator 24 of the rotating electrical machine 2, the lower end of the path of revolution of the pinion gears of the planetary gear mechanisms of the speed reduction device 3, and the lower end of the differential gear device 4. However, without being limited to this, when the outside diameter of the path of revolution of the pinion gear of the planetary gear mechanism of the speed reduction device 3 is greater than the inside diameter of the stator 24, the oil surface 7A in the steady circulation state may be positioned on the upper side V1 relative to the lower end of the path of revolution of the pinion gear of the planetary gear mechanism of the speed reduction device 3. Likewise, when the outside diameter of the differential gear device 4 is greater than the inside diameter of the stator 24, the oil surface 7A in the steady circulation state may be positioned on the upper side V1 relative to the lower end of the differential gear device 4. Likewise, the oil surface 7A in the steady circulation state may be positioned on the upper side V1 relative to both the lower end of the path of revolution of the pinion gear of the planetary gear mechanism of the speed reduction device 3 and the lower end of the differential gear device 4.

(7) According to the example described in the above embodiment, the oil passages (the introduction oil passage 81, the in-shaft oil passage 82, the connection oil passages 83, and the distribution passages 84) communicating with the rotating electrical machine 2, the speed reduction device 3, and the differential gear device 4 are formed. However, without being limited to this, oil passages communicating with any one of the rotating electrical machine 2, the speed reduction device 3, and the differential gear device 4 may be formed, or oil passages communicating with any two of the rotating electrical machine 2, the speed reduction device 3, and the differential gear device 4 may be formed.

(8) It is noted that, as long as there is no inconsistency, the structure disclosed in any of the embodiments described above may be used in combination with the structure disclosed in others of the embodiments. As for other structures, the embodiments disclosed in this description should be considered in all aspects as illustrative. Therefore, various modifications that fall within the spirit of the present disclosure are possible as appropriate.

SUMMARY OF THE ABOVE EMBODIMENTS

Below is a summary of the vehicle driving apparatus (100) described above.

A vehicle driving apparatus (100) includes the following: a rotating electrical machine (2) that acts as a source of driving force for a first wheel (501) and a second wheel (502); a speed reduction device (3) that reduces the speed of rotation of the rotating electrical machine (2); a differential gear device (4) that distributes, to the first wheel (501) and the second wheel (502), the driving force transmitted from the rotating electrical machine (2) via the speed reduction device (3); a case (1) that houses the rotating electrical machine (2), the speed reduction device (3), and the differential gear device (4); and an oil circulation mechanism. The rotating electrical machine (2) has a cylinder-shaped stator (24) and a rotor (21) that is located on a radially inner side (R2) relative to the stator (24). The speed reduction device (3) and the differential gear device (4) are located coaxial with the rotating electrical machine (2). Oil (7) is stored in the case (1). The oil circulation mechanism circulates the oil (7) within the case (1). In a steady circulation state where circulation of the oil (7) is in a steady state, an oil surface (7A) that is the top surface of the oil (7) is positioned on a lower side (V2) relative to a lower end of an inner circumferential surface (24a) of the stator (24) and is positioned on an upper side (V1) relative to a lower end of an outer circumferential surface (24b) of the stator (24).

According to this structure, in the steady circulation state, where the position of the oil surface (7A) is stable, it is possible to ensure a relatively large amount of oil that allows the stator (24) to be partially submerged in the oil surface (7A) while keeping the rotor (21), which is a rotating member of the rotating electrical machine (2), out of contact with the oil surface (7A). Thus, when the oil (7) is stored in a space located in the case (1) and housing the rotating electrical machine (2), it is possible to reduce resistance of the oil (7) to stirring by the rotor (21) of the rotating electrical machine (2) while ensuring an appropriate amount of oil needed to cool the stator (24) of the rotating electrical machine (2), to lubricate the rotating member such as the rotor (21), etc.

It is preferable that the speed reduction device (3) include a planetary gear mechanism (31, 32) having a sun gear (S31, S32), a pinion gear (P31, P32) that revolves around the sun gear (S31, S32), and a ring gear (R31, R32) fixed with respect to the case (1), and that in the steady circulation state, the oil surface (7A) be positioned on the lower side (V2) relative to a lower end of a path of revolution of the pinion gear (P31, P32).

According to this structure, in the steady circulation state, where the position of the oil surface (7A) is stable, the pinion gear (P31, P32) of the speed reduction device (3), which is a rotating member, is not in contact with the oil surface (7A). Thus, it is possible to reduce the resistance of the oil (7) to stirring by the pinion gear (P31, P32) of the speed reduction device (3). In particular, since the pinion gear (P31, P32) of the speed reduction device (3) rotates faster than other rotating members in the case (1), it is possible to effectively reduce the resistance of the oil (7) to stirring by rotating members.

Further, in the steady circulation state, the oil surface (7A) may be preferably positioned on the lower side (V2) relative to a lower end of the differential gear device (4).

According to this structure, in the steady circulation state, where the position of the oil surface (7A) is stable, a rotating member that is located furthest to the radially outer side (R1) in the differential gear device (4) is not in contact with the oil surface (7A). Thus, it is possible to reduce resistance of the oil (7) to stirring by the differential gear device (4).

Furthermore, an inside diameter of the stator (24) may be preferably equal to or greater than an outside diameter of the path of revolution of the pinion gear (P31, P32).

According to this structure, the lower end of the path of revolution of the pinion gear (P31, P32) of the speed reduction device (3) is in the same position in the vertical direction (V) as the lower end of the inner circumferential surface (24a) of the stator (24) or is positioned on the upper side (V1) relative to the lower end of the inner circumferential surface (24a) of the stator (24). Thus, setting the position of the oil surface (7A) to the lower side (V2) relative to the inner circumferential surface (24a) of the stator (24) allows the pinion gear (P31, P32) of the speed reduction device (3) to avoid contact with the oil surface (7A). Therefore, it is possible to reduce resistance of the oil (7) to stirring by the rotor (21) of the rotating electrical machine (2) and by the pinion gear (P31, P32) of the speed reduction device (3).

Moreover, it is preferable that the oil circulation mechanism be an oil pump (8), and that the oil pump (8) suction the oil (7) stored in the case (1) and supply the oil (7) to an oil passage (81, 82, 83, 84) that is formed on the case (1) or a member housed in the case (1).

According to this structure, it is possible to appropriately supply the oil (7) through the oil passage (81, 82, 83, 84) to the member housed in the case (1), such as the rotating electrical machine (2).

When the oil circulation mechanism is the oil pump (8), the oil passage (81, 82, 83, 84) may preferably communicate with at least one of the rotating electrical machine (2), the speed reduction device (3), and the differential gear device (4).

According to this structure, it is possible to appropriately supply the oil (7) through the oil passage (81, 82, 83, 84) to at least one of the rotating electrical machine (2), the speed reduction device (3), and the differential gear device (4).

Further, the speed reduction device (3) may be preferably located between the rotating electrical machine (2) and the differential gear device (4) in an axial direction (L).

According to this structure, it is possible to simplify the arrangement of members housed in the case (1). Thus, this structure facilitates the supply of the oil (7) to the members housed in the case (1).

INDUSTRIAL APPLICABILITY

The technique according to the present disclosure is applicable to a vehicle driving apparatus including the following: a rotating electrical machine that acts as a source of driving force for a first wheel and a second wheel; a speed reduction device that reduces the speed of rotation of the rotating electrical machine; a differential gear device that distributes, to the first wheel and the second wheel, the driving force transmitted from the rotating electrical machine via the speed reduction device; and a case that houses them.

The invention claimed is:

1. A vehicle driving apparatus comprising:
a rotating electrical machine that acts as a source of driving force for a first wheel and a second wheel;
a speed reduction device that reduces a speed of rotation of the rotating electrical machine;
a differential gear device that distributes, to the first wheel and the second wheel, the driving force transmitted from the rotating electrical machine via the speed reduction device;
a case that houses the rotating electrical machine, the speed reduction device, and the differential gear device; and
an oil circulator, wherein
the rotating electrical machine has a cylinder-shaped stator and a rotor that is located on a radially inner side relative to the stator,
the speed reduction device and the differential gear device are located coaxial with the rotating electrical machine,
oil is stored in the case,
the oil circulator circulates the oil within the case,
in a steady circulation state where circulation of the oil is in a steady state, an oil surface that is a top surface of the oil is positioned on a lower side relative to a lower end of an inner circumferential surface of the stator and is positioned on an upper side relative to a lower end of an outer circumferential surface of the stator, and
an inside diameter of the stator is equal to or greater than an outside diameter of a path of revolution of a pinion gear of the speed reduction device.

2. The vehicle driving apparatus according to claim 1, wherein
in the steady circulation state, the oil surface is positioned on the lower side relative to a lower end of the differential gear device.

3. The vehicle driving apparatus according to claim 1, wherein
the oil circulator is an oil pump, and
the oil pump suctions the oil stored in the case and supplies the oil to an oil passage that is formed on the case or a member housed in the case.

4. The vehicle driving apparatus according to claim 1, wherein
the speed reduction device is located between the rotating electrical machine and the differential gear device in an axial direction.

5. A vehicle driving apparatus comprising:
a rotating electrical machine that acts as a source of driving force for a first wheel and a second wheel;
a speed reduction device that reduces a speed of rotation of the rotating electrical machine;
a differential gear device that distributes, to the first wheel and the second wheel, the driving force transmitted from the rotating electrical machine via the speed reduction device;
a case that houses the rotating electrical machine, the speed reduction device, and the differential gear device; and
an oil circulator, wherein
the rotating electrical machine has a cylinder-shaped stator and a rotor that is located on a radially inner side relative to the stator,
the speed reduction device and the differential gear device are located coaxial with the rotating electrical machine,
oil is stored in the case,
the oil circulator circulates the oil within the case,
in a steady circulation state where circulation of the oil is in a steady state, an oil surface that is a top surface of the oil is positioned on a lower side relative to a lower end of an inner circumferential surface of the stator and is positioned on an upper side relative to a lower end of an outer circumferential surface of the stator,
the speed reduction device includes a planetary gear mechanism having a sun gear, a pinion gear that revolves around the sun gear, and a ring gear fixed with respect to the case, and
in the steady circulation state, the oil surface is positioned on the lower side relative to a lower end of a path of revolution of the pinion gear.

6. The vehicle driving apparatus according to claim 5, wherein
in the steady circulation state, the oil surface is positioned on the lower side relative to a lower end of the differential gear device.

7. The vehicle driving apparatus according to claim 6, wherein
an inside diameter of the stator is equal to or greater than an outside diameter of the path of revolution of the pinion gear.

8. The vehicle driving apparatus according to claim 7, wherein
the oil circulator is an oil pump, and
the oil pump suctions the oil stored in the case and supplies the oil to an oil passage that is formed on the case or a member housed in the case.

9. The vehicle driving apparatus according to claim 8, wherein
the oil passage communicates with at least one of the rotating electrical machine, the speed reduction device, and the differential gear device.

10. The vehicle driving apparatus according to claim 9, wherein
the speed reduction device is located between the rotating electrical machine and the differential gear device in an axial direction.

11. The vehicle driving apparatus according to claim 5, wherein
an inside diameter of the stator is equal to or greater than an outside diameter of the path of revolution of the pinion gear.

12. The vehicle driving apparatus according to claim 11, wherein
the oil circulator is an oil pump, and
the oil pump suctions the oil stored in the case and supplies the oil to an oil passage that is formed on the case or a member housed in the case.

13. The vehicle driving apparatus according to claim 12, wherein
the oil passage communicates with at least one of the rotating electrical machine, the speed reduction device, and the differential gear device.

14. The vehicle driving apparatus according to claim 13, wherein
the speed reduction device is located between the rotating electrical machine and the differential gear device in an axial direction.

15. A vehicle driving apparatus comprising:
a rotating electrical machine that acts as a source of driving force for a first wheel and a second wheel;
a speed reduction device that reduces a speed of rotation of the rotating electrical machine;
a differential gear device that distributes, to the first wheel and the second wheel, the driving force transmitted from the rotating electrical machine via the speed reduction device;
a case that houses the rotating electrical machine, the speed reduction device, and the differential gear device; and
an oil circulator, wherein
the rotating electrical machine has a cylinder-shaped stator and a rotor that is located on a radially inner side relative to the stator,
the speed reduction device and the differential gear device are located coaxial with the rotating electrical machine,
oil is stored in the case,
the oil circulator circulates the oil within the case, and
in a steady circulation state where circulation of the oil is in a steady state, an oil surface that is a top surface of the oil is positioned on a lower side relative to a lower end of an inner circumferential surface of a stator coil of the stator and is positioned on an upper side relative to a lower end of an outer circumferential surface of the stator coil of the stator.

16. The vehicle driving apparatus according to claim 15, wherein
an inside diameter of the stator is equal to or greater than an outside diameter of a path of revolution of a pinion gear of the speed reduction device.

17. The vehicle driving apparatus according to claim 16, wherein
the oil circulator is an oil pump, and
the oil pump suctions the oil stored in the case and supplies the oil to an oil passage that is formed on the case or a member housed in the case.

18. The vehicle driving apparatus according to claim 17, wherein
the oil passage communicates with at least one of the rotating electrical machine, the speed reduction device, and the differential gear device.

19. The vehicle driving apparatus according to claim 18, wherein
the speed reduction device is located between the rotating electrical machine and the differential gear device in an axial direction.

20. The vehicle driving apparatus according to claim 15, wherein
in the steady circulation state, the oil surface is positioned on the lower side relative to a lower end of the differential gear device.

\* \* \* \* \*